Figure 1:
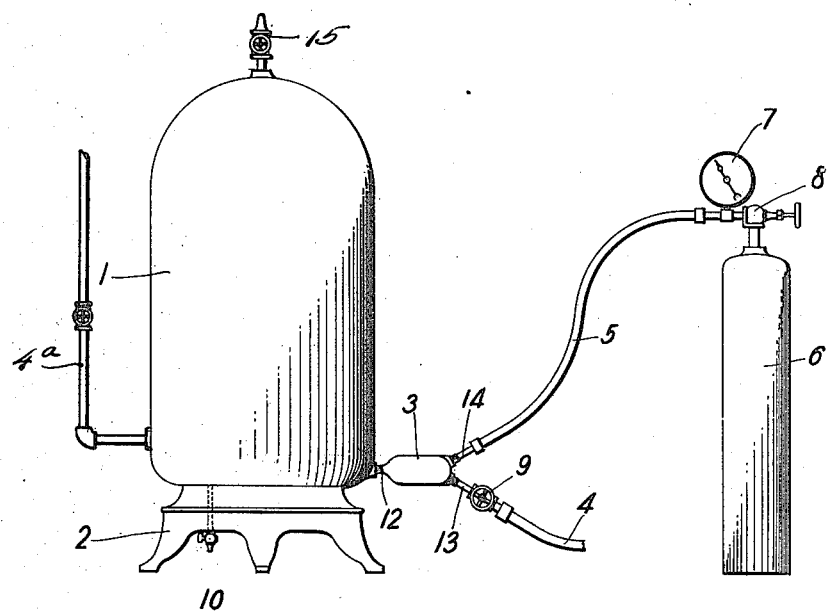

M. V. RITCHEY.
METHOD OF CARBONATING BEVERAGES.
APPLICATION FILED NOV. 15, 1916.

1,261,294.

Patented Apr. 2, 1918.

WITNESSES

INVENTOR
Murray V. Ritchey
by William B. Wharton
his attorney

UNITED STATES PATENT OFFICE.

MURRAY V. RITCHEY, OF VERONA, PENNSYLVANIA.

METHOD OF CARBONATING BEVERAGES.

1,261,294.  Specification of Letters Patent.  Patented Apr. 2, 1918.

Application filed November 15, 1916. Serial No. 131,383.

*To all whom it may concern:*

Be it known that I, MURRAY V. RITCHEY, a citizen of the United States, and a resident of Verona, in the county of Allegheny and State of Pennsylvania, have invented a new and useful Improvement in Methods of Carbonating Beverages, of which the following is a specification.

This invention relates to a method of carbonating beverages.

The object of the invention is to provide a method of carbonating beverages in which the carbonated liquid is normally maintained under a high water pressure, and the connection between the tank containing the carbonated liquid and the source of the carbonating gas is normally cut off. A further object of the invention is to provide for a thorough pre-mixing of the gas and liquid upon introduction into the storage tank, thus saturating the liquid in the tank with the gas; the full effect of the gas used being obtained by the agitation of the liquid in the tank due to the high water pressure under which it is normally maintained, this pressure causing a violent inflow of water into the tank, and consequent agitation of the liquid contents, upon each withdrawal of the liquid therefrom.

Prior methods of carbonating beverages have employed a system in which a connection between the tank containing the carbonated liquid and the gas tank or carboy is normally maintained, so that the liquid in the tank is constantly under pressure from a source of gas supply. In such a case while the gas pressure remains constant, the liquid is supplied to the tank as becomes necessary from the drawing off of liquid from the tank; most apparatus for carbonating liquids by this method being provided with special means for maintaining a constant level of liquid in the tank. In the method of the present invention the liquid in the tank is normally maintained in contact with a water supply under a high water pressure, and the gas is turned on and allowed to mix with the liquid only when the liquid in the tank becomes vitiated and flat from continued dilution, and it is necessary to introduce a fresh charge of gas.

Figure 2:
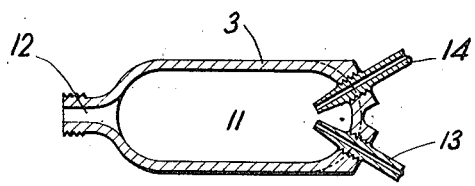

In the accompanying drawings, Figure 1 is an elevation of a carbonating or storage tank having gas and water connections arranged to accomplish the object of the present invention; and Fig. 2 is a longitudinal sectional view of the mixer in which the water and gas are mixed upon their introduction to the tank.

The carbonating, or storage tank 1, may be of any desired form and mounted in any desired manner, as shown it is supported by a base 2 adapted to rest upon the floor or any suitable stand. Adjacent this base the tank is provided with a mixing chamber 3 screw-threaded or otherwise suitably secured in the wall of the tank and in communication with the interior thereof, and to this mixing tank lead the water supply pipe 4 and the gas supply pipe 5. The gas line is connected to a tank or carboy 6 of the usual type, being preferably connected through the usual pressure gage 7 arranged to indicate the gas pressure furnished by the tank. The water supply pipe 4 leads from a suitable source of supply, such as a water main, which is capable of providing water under high pressure. Whatever the source of supply this pressure should not be substantially less than one hundred pounds, and is preferably considerably greater than one hundred pounds in order that the water may enter the tank with sufficient force to cause a marked agitation of the contents thereof. Communicating with the interior of the tank at any suitable point is the carbonated water discharge pipe 4ª for drawing off the carbonated water.

In carrying out the carbonating method, suitable valves or cocks 8 and 9 on the gas tank and the water line respectively, are opened to admit carbon dioxid gas and water simultaneously to the mixer 3 until the tank 1 is filled. When the tank is filled the gas supply is cut off at its source, but the water line is permitted to continue in communication with the interior of the tank to maintain a constant pressure on the liquid therein and normally keep the tank substantially filled with water. Each withdrawal of charged water from the tank will cause a fresh inflow of water thereinto, with a consequent agitation of the charged water therein such as will cause an increase in the sparkling quality of the water being withdrawn. When it is found that the water in the tank has become vitiated and flat, the gas may be turned on to effect a recharging of the water in the tank. In performing this operation it is preferable that the water line be first turned off and the tank partially or completely drained through the draw-off cock 10; and the gas and water introduced simultaneously as in the original charging operation. In any case, however, as soon as a fresh charge of gas has been introduced and the tank filled with water, the gas supply is again cut off and the water line permitted to remain in communication with the interior of the tank and maintain a high pressure on the contents thereof.

The mixer 3 is formed to provide a chamber 11 into which the gas and water lines enter, and a constricted portion 12 opening into the tank 1. The water line 4 and gas line 5 are provided at their ends adjacent the tank with rigid nozzle members 13 and 14 respectively, which are screw-threaded or otherwise suitably secured in place in the wall of the mixer. These nozzles 13 and 14 extend inwardly of the chamber 11 and are directed toward each other so that the jets of gas and water impinge and are thoroughly mixed in the chamber 11. The constricted portion 12 of the mixer also prevents too ready an egress from the chamber 11 and thereby assists in the complete mixture of the gas and water. This will obviously be effected by the pressure under which they are both introduced, the intimacy into which the jets of both are brought, and by the relatively small space provided by the mixing chamber, which allows the liquid to be greatly agitated by both its own and the gas pressure.

A relief valve or cock 15 is preferably provided at the upper extremity of the tank to permit the escape of air during the charging of the tank, and to relieve the accumulation of gas should the same become so excessive as to materially lower the normal level of the liquid in the tank and result in the loss of carbonated liquid through the bucking back of the contents of the tank into the liquid pressure line 4. The valve 15 may, however, be in general omitted if so desired, since the agitation of the liquid during withdrawal of carbonated liquid from the tank results in a sufficient absorption of the trapped gases to permit the ready entrance of water under high pressure into the tank.

The method above described presents obvious advantages over the usual carbonating methods, since the high water pressure normally maintained on the carbonating tank to a large extent takes the place of the gas pressure normally maintained on the contents of the tank in prior methods. Since the gas is turned off at its source there is no leakage through the connections between the gas and carbonating tanks, and the thorough pre-mixing of the gas and water, and the agitation caused by the inflow of fresh water under the normal high water pressure upon withdrawal of liquid from the tank secures the greatest possible degree of carbonation with the least amount of gas.

Although the form of mixer above described is preferred for satisfactorily carrying out the method of the present invention, the appended method claims are not limited to the specific form of apparatus shown and described, since any alternative form may be employed which will thoroughly mix the gas and water and allow the method to be successfully practised.

What I claim is:—

1. The method of carbonating liquids which comprises introducing carbon dioxid gas and the liquid under high pressure into a carbonating tank, cutting off the gas supply and normally maintaining the source of liquid under high pressure in communication with the interior of the tank whereby the tank is maintained substantially full of liquid under pressure and a thorough agitation of the contents of the tank is produced by inflow of liquid under high pressure into the tank when carbonated liquid is withdrawn therefrom.

2. The method of carbonating liquids which comprises introducing into a carbonating tank a charge of liquid carbonated by bringing together jets of carbon dioxid gas and the liquid under high pressure, cutting off the gas supply and normally maintaining the source of liquid under high pressure in communication with the interior of the tank whereby the tank is maintained substantially full of liquid under pressure and a thorough agitation of the contents of the tank is produced by inflow of liquid under high pressure into the tank when carbonated liquid is withdrawn therefrom.

3. The method of carbonating liquids which comprises introducing into a carbonating tank a liquid carbonated by bringing together jets of carbon dioxid gas and the liquid under high pressure, cutting off the gas supply and normally maintaining the source of liquid under high pressure in communication with the interior of the tank whereby the tank is maintained substantially full of liquid under pressure and a thorough agitation of the contents of the tank is produced by inflow of liquid under high pressure into the tank when carbonated liquid is withdrawn therefrom; and in recarbonating by cutting off communication between the tank and source of high liquid pressure, lowering the level of liquid in the tank, and refilling the tank by the introduction of liquid carbonated as formerly by bringing together jets of carbon dioxid gas and of the liquid under pressure.

4. The method of carbonating liquids which comprises introducing carbon dioxid gas and the liquid under high pressure into a carbonating tank, cutting off the gas supply and normally maintaining the source of liquid under high pressure in communication with the interior of the tank, whereby the tank is maintained substantially full of liquid under pressure and a thorough agitation of the contents of the tank is produced by inflow of liquid under high pressure into the tank when carbonated liquid is withdrawn therefrom; and in recarbonating by cutting off communication between the tank and source of high liquid pressure, lowering the level of liquid in the tank, and refilling the tank as formerly by introducing carbon dioxid gas and the liquid under high pressure.

In witness whereof, I have hereunto set my hand.

MURRAY V. RITCHEY.

Witness:
SUE B. FRITZ.